Oct. 9, 1956 — J. K. STORY — 2,765,541
INSTRUMENT FLOAT
Filed Aug. 27, 1954

JAMES K. STORY,
INVENTOR.

ATTORNEY.

United States Patent Office 2,765,541
Patented Oct. 9, 1956

2,765,541
INSTRUMENT FLOAT

James K. Story, Long Beach, Calif., assignor to V. E. Kuster, Long Beach, Calif.

Application August 27, 1954, Serial No. 452,649

11 Claims. (Cl. 33—223)

This invention relates to improvements in liquid-carried floats of the type comprising a liquid floated part maintained in an entirely free condition for whatever movement the float may be used, and is therefore applicable to any of the various types of instruments employing floats. More particularly, the invention concerns the provision of improvements in the float body such as contribute, in cooperation with the physical shape and condition of a liquid surface, to increased stability and resistance to displacement of the float, and thereby to provide for increased dependability and accuracy of the instrument of which the float is a part.

As is known, floats have been constructed having an upstanding edge part engageable with the curved underside of a meniscus formed by adjacent wall surfaces in order that the meniscus may present a barrier to transverse float movement. This has been done in an attempt to obtain maximum freedom of the float for movement in the liquid, while at the same time preventing lateral displacement of the float for purposes of instrument accuracy in measurement. Such floats have been disclosed in U. S. Patent Nos. 2,500,410, and 2,500,411 issued to John C. Hewitt, Jr. It has been found, however, that previous attempts to stabilize non-center guided floats have not been entirely satisfactory for the reason that a typical float tends to rock in use as well as to move laterally or transversely, the former motion being largely unprevented by engagement of the upstanding edge part of a float with a meniscus.

The present invention has for its primary purpose the provision of means for minimizing the disturbance of the float resulting from attempted angular displacement, i. e. rocking movement, of the float, as well as lateral or transverse movement thereof. As will be presently described, it is proposed to form projections on the top of the submerged float having a shape and location such as will influence the formation, through surface tension, of liquid barriers opposing rocking motion and lateral displacement of the float. In the present invention advantage is taken of the fact that a liquid surface tends to assume the minimum surface area consistent with the external forces acting on the liquid. Accordingly, projections are formed on the top of the submerged float to engage the under convex side of the meniscus formed adjacent a container wall at points removed from the wall and spaced from the edge of the float so that liquid barriers presented to these projections resist rocking motion of the float and lateral movement thereof.

In particular, the top of the float has an upstanding rim formed near its edge to engage the underside of the meniscus formed adjacent the stationary wall, and in addition, a plateau or a ridge having an edge is formed on the top and spaced from the rim, so as to deflect upwardly the tensioned surface of the downwardly curving meniscus, to form a liquid barrier between the rim and plateau or ridge. Since displacement of the float from a centered or symmetrical position has a tendency to enlarge the surface area of the liquid covering the float, such displacement is opposed by the surface tension forces of the liquid which constantly seek to maintain a minimum surface area consistent with external forces acting on the liquid, such as the forces of adhesion and the forces of gravity. Therefore, when one side of the float seeks to rock upward, the liquid barrier facing the plateau or ridge located on that side directly opposes such displacement.

Other objects and features of the invention are to provide a float body including a hemispherical portion and a separate top which may be joined to the former in a convenient manner, the top having a central opening permitting fluid to enter the float and having an underside sloped toward the opening to facilitate flow of fluid along the underside toward and from the opening. There is also provided a body portion extending transversely from the upstanding rim described above and terminating close to the stationary container wall to prevent lateral movement of the float relative to the container wall under conditions of rapid transverse movement of the instrument containing the float.

The invention has various additional features and objects, all of which together with the details of certain illustrative embodiments will be understood to better advantage from the following description of the accompanying drawing, in which.

Figure 1:
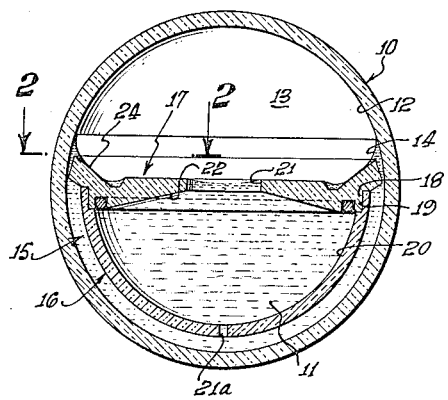
Fig. 1 is an elevational view of the container and float taken in cross section.
Figure 2:
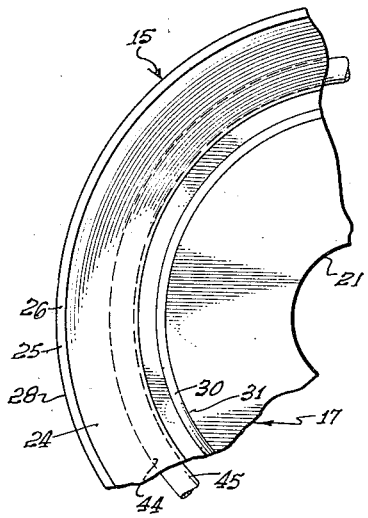
Fig. 2 is an enlarged plan view of a portion of the container and float taken on line 2—2 of Fig. 1.
Figure 3:
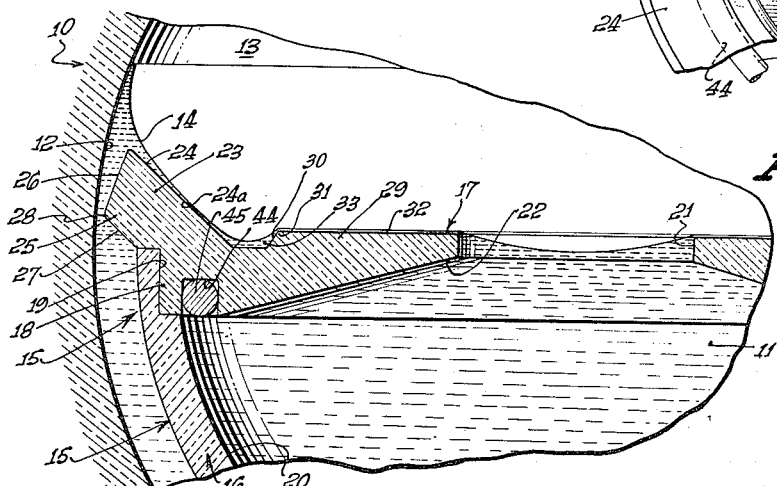
Fig. 3 is an enlarged fragmentary view of a portion of the container and float shown in Fig. 1.

Referring first to Figs. 1, 2 and 3, as used typically in a compass, the transparent container 10 may be formed of material such as glass or clear organic plastic wettable by the contained liquid 11, the container having spherical inner surface 12. The liquid fills the container in chamber 13 to a level somewhat above the equator thereof, and by reason of its surface tension and adhesion to inner surface 12 the liquid forms an annular meniscus 14, which curves downwardly and away from the wall 12 toward a vertical axis through the container.

The float, generally indicated at 15, is shown typically to comprise a hollow body including a lower hemispherical transparent wall portion 16 opening upwardly, and a circular top portion 17 having an annular shoulder 18 joined to the annular edge 19 of the hemispherical portion. The interior of the hollow body 20 of the float is in communication with the outside liquid body through a bottom opening 21a and a central opening 21 in the top of the float, the underside 22 of the top being sloped inwardly and upwardly toward the opening 21 to facilitate flow of fluid adjacent the underside toward and away from the opening, this construction aiding the stability of the float.

As better shown in Fig. 3, the top of the float has an annular upstanding projection such as rim 23 formed at its outer side, the rim projecting upwardly under the meniscus, and the face 24 of the rim engaging the under convex side of the meniscus at a relatively high elevation 24a. The angularity of the face 24, which is sloped upwardly and outwardly, is such as to effectively bear against the underside of the meniscus so as to be prevented from transverse displacement away from wall 12 by the natural liquid barrier formed by the meniscus. Rim 23 includes a transversely extending annular wing 25 which has sloped surfaces 26 and 27 convergent toward edge 28 positioned close to the inner wall 12 of the container at a point between that wall and the float. Edge 28 limits transverse displacement of the float toward the wall 12 upon rapid transverse movement of the container 10, so as not to materially disturb the centered condition of the float, while at the same time permitting free rotation of the float within the body of liquid 11.

Another projection, comprising for example, a plateau 29, extends upwardly from the top 17 and is spaced inwardly toward the center of the float from the rim 23. The outwardly facing side 30 of the plateau extends upwardly and inwardly toward an edge 31 intersecting the horizontal top 32 of the plateau, edge 31 serving to deflect upwardly the tensioned surface of the meniscus at a relatively lower elevation, so as to bring about the creation of a downwardly convex liquid barrier 33 interposed between the rim 23 and plateau 29 and opposing movement of the float relative to the wall 12. As shown in Fig. 3, all the surface portions of the top of the float are submerged below the surface of the liquid. Barrier 33 directly opposes rocking displacement of the float 15, since upward angular movement of side 30 of the plateau is directly opposed by the liquid barrier 33. Such rocking movement of the float would tend to disturb the natural shape of the tensioned surface of the liquid, which assumes minimum area, and forces of cohesion of the liquid molecules at the surface of the liquid tend to restore the shape of the surface film to give it minimum surface area consistent with the shape of the rim 23 and plateau 29 and the external forces acting on the liquid, and thus to stabilize the float.

Figure 4:
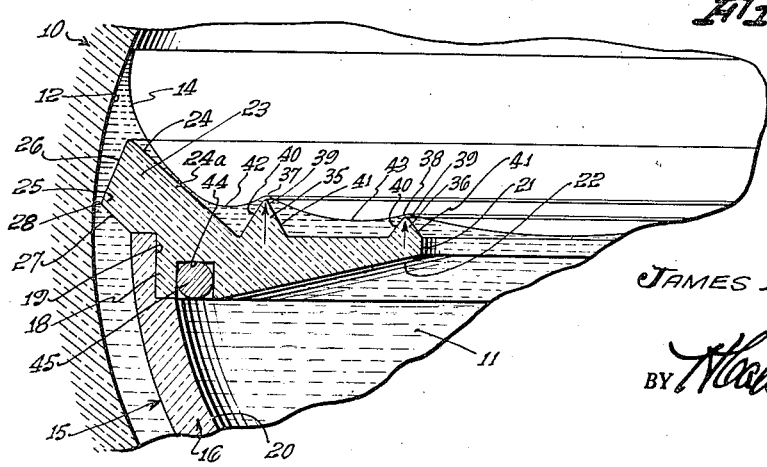
Fig. 4 is an elevational fragmentary view of a portion of a container and float of modified construction.

A modified float is shown in Fig. 4, similar parts being given the same numbers as in Fig. 3. The modification consists in the substitution of one or more ridges 35 and 36 on the top of the float for the previously described plateau 29. Spaced annular ridges 35 and 36 project upwardly so as to deflect upwardly the tensioned surface of the downwardly curved meniscus at points 37 and 38. Ridge 36 is spaced inwardly from ridge 35 and lies adjacent the opening 21 formed in the top. Each of the ridges is tapered upwardly toward a crest 39 formed by the convergence of sloped opposite sides 40 and 41. As will be seen from the drawings, the crest 39 of ridge 35 does not project upwardly as far as the meniscus-engaging surface 24 of the rim 23, and also the crest 39 of ridge 36 does not project upwardly as far as the crest of ridge 35. This differential height of the rim and the two ridges is in conformance with the downwardly and inwardly sloped curvature of the surface of the liquid meniscus extending inwardly from container wall 12, so that the crest 39 of the two ridges may deflect upwardly the tensioned surface of the liquid without causing rupture thereof. As will also be seen from Fig. 4, the tensioned surface of the liquid between the ridges and between the rim and ridge 35 assumes a downwardly convex shape presenting barriers 42 and 43 facing the sloped surfaces 40 of the ridges, and resisting movement of the ridges both transversely toward the wall 10 and angularly upwardly as caused by rocking movement of the float.

In each of the Figs. 3 and 4 the underside of the top 17 of the float contains an annular cavity 44 of rectangular cross section in which an annular magnet 45 is mounted. The magnet serves the usual function of aligning the float in the direction of magnetic lines of force to cause the float to operate as the movable element of a compass. The weight of the magnet is distributed uniformly around the float near the side thereof to lend an added degree of stability to the float. It should also be noted that the specific gravity of the float, which includes the weight of the magnet, is slightly less than the specific gravity of the liquid 11, so that the submerged float is urged upward by the displaced liquid, permitting the projections extending upwardly from the top 17 to cooperate with the tensioned surface of the liquid to stabilize the float, as described above.

I claim:

1. A stabilized instrument float submerged in a liquid having a specific gravity slightly greater than the specific gravity of the float, the liquid forming a meniscus having a tensioned surface curving downwardly and away from a wettable wall, said float comprising a body carrying spaced projections extending upwardly therefrom and engaging the underside of said tensioned surface at spaced locations along its downward curvature so that said surface presents a barrier to movement of the float relative to said wall, one of said projections being closely laterally adjacent said wall, and the other projection being horizontally spaced farther from said wall.

2. A stabilized instrument float submerged in a liquid having a specific gravity slightly greater than the specific gravity of the float, the liquid forming a meniscus having a tensioned surface curving downwardly and away from a wettable wall, said float comprising a body carrying spaced projections extending upwardly therefrom to different elevations to engage the underside of said tensioned surface at spaced locations along its downward curvature so that said surface presents a barrier to movement of the float relative to said wall, one of said projections being closely laterally adjacent said wall, and the other projection being horizontally spaced farther from said wall.

3. A stabilized meniscus centered float device comprising a body of liquid, a float part submerged in the liquid and movably supported thereby for rotation about a vertical axis, a wall extending about said float in closely spaced relation thereto, said liquid having a tensioned surface above the float forming a meniscus curving downwardly and inwardly from said wall, said float having a first projection extending upwardly adjacent said wall and engaging upwardly against the underside of said downwardly and inwardly curving meniscus, and said float having a second projection extending upwardly at a location radially inwardly of said first projection but not extending as high as said first projection and engaging upwardly against the underside of said tensioned surface of the liquid to coact with the first projection in centering the float.

4. A float device as recited in claim 3, in which said wall and said two projections are all annular.

5. A float device as recited in claim 3, in which said wall is a side wall of a container holding said liquid and is curved spherically to remain in closely spaced centering relation to the float even when the container is tilted relative to the float.

6. A float device as recited in claim 3, in which said first projection is an annular rim on the float having a downwardly and inwardly inclined surface engaging the underside of said meniscus.

7. A float device as recited in claim 3, in which said second projection is annular and locally deforms said surface of the liquid upwardly at the location of said second projection.

8. A float device as recited in claim 3, in which said float has a third projection extending upwardly at a location spaced inwardly from the second projection but not as high as the second projection and engaging upwardly against said liquid surface.

9. A float device as recited in claim 3, in which said float is circular, and said projections are annular, said first projection having an annular surface inclined downwardly and inwardly and engaging the underside of said curving meniscus, said wall forming a container holding said liquid and being spherical to remain in closely spaced centering relation to said float even when the container is tilted relative to the float.

10. A float device as recited in claim 3, in which said second projection takes the form of an annular plateau.

11. A float device as recited in claim 3, in which said second projection takes the form of an annular projection of upwardly tapering cross section.

References Cited in the file of this patent

UNITED STATES PATENTS

| | | |
|---|---|---|
| 2,500,410 | Hewitt | Mar. 14, 1950 |
| 2,500,411 | Hewitt | Mar. 14, 1950 |